May 23, 1939.  C. A. CAMPBELL  2,159,687
AIR BRAKE
Filed Aug. 2, 1938   3 Sheets-Sheet 1
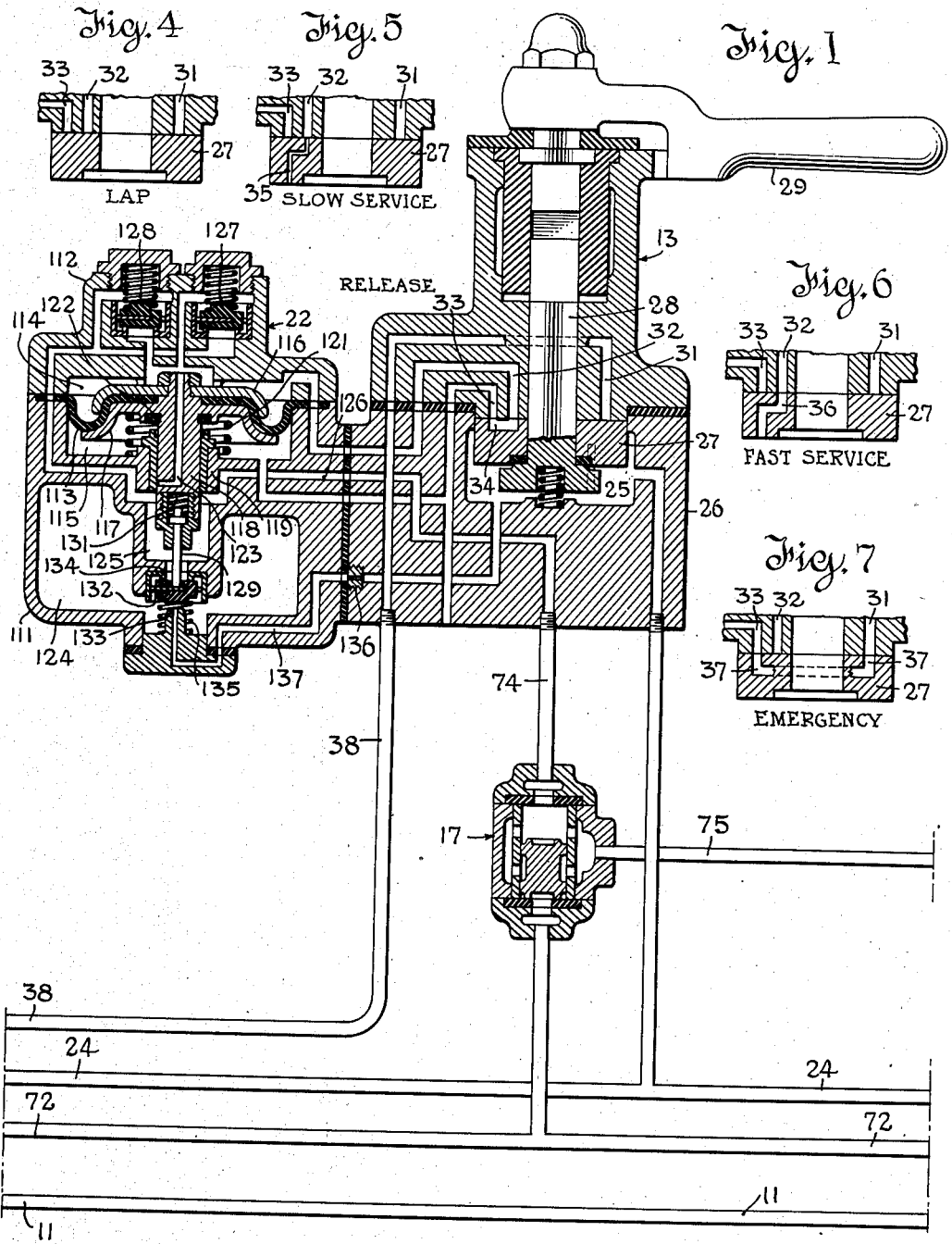
Inventor
Charles A. Campbell
By
Dodge and Son
Attorneys May 23, 1939.  C. A. CAMPBELL  2,159,687
AIR BRAKE
Filed Aug. 2, 1938  3 Sheets-Sheet 2

Inventor
Charles A. Campbell
By
Dodge
Attorneys

May 23, 1939.  C. A. CAMPBELL  2,159,687
AIR BRAKE
Filed Aug. 2, 1938  3 Sheets-Sheet 3

Inventor
Charles A. Campbell
By
Dodge and Son
Attorneys

Patented May 23, 1939

2,159,687

UNITED STATES PATENT OFFICE 2,159,687

AIR BRAKE

Charles A. Campbell, Watertown, N. Y., assignor to The New York Air Brake Company, a corporation of New Jersey Application August 2, 1938, Serial No. 222,690

13 Claims. (Cl. 303—24)

This invention relates to air brakes, and particularly to brake controlling means where a control chamber and master relay are used.

In modern deceleration controlled brakes, and similar systems involving some type of automatic modulation of braking pressure (schedule HSC being typical), there are usually two service positions of the engineer's brake valve, a first service (sometimes called "slow service") position and a second service, which is a fast service position. The first develops control chamber pressure slowly so that the engineer may exercise graduated control below that degree of application at which the deceleration controller functions to assume control. What that degree is, depends on train speed. The second position builds up control chamber pressure very rapidly and is the one used when rapid straight air application and prompt assumption of control by the decelerometer are desired.

In the early installations, the brakes commenced to apply with very slight rise of brake cylinder pressure, but the application of return springs, anti-rattling fittings, multiple-shoe clasp brakes, and other refinements found desirable as the design advanced, has changed the situation. At present the brakes do not apply until a brake cylinder pressure of fifteen to twenty pounds gage (for example) is reached. This entails a serious time lag in slow service position between motion of the engineer's brake valve to such position and the initial braking effect on the wheels.

The prime purpose of the present invention is to provide means comprising a measured inshot device which upon the initial movement of the engineer's brake valve to slow service position, will immediately establish sufficient pressure in the control chamber to start effective braking at a low value. The device is so contrived as not to repeat its function until reset as an incident to substantially complete release of the brakes.

Thus the device operates once on initial motion to either service position, and thereafter is inert so long as the application continues. Hence, the engineer may graduate the brake application by increasing or diminishing control chamber pressure, without interference by the measured inshot device, but as soon as he releases the brakes the measured inshot device is reset and recharged ready to expedite commencement of the next "slow" application.

An important aspect of the invention, particularly for high speed service is that a single device affects all the brakes throughout the train at the same time and in the same degree. This has great practical importance because it assures harmonious action of all the brakes.

While the invention may be used with any system having a control chamber and master relay, I shall describe it as embodied in schedule HSC, to indicate how it may be related to a deceleration controlled electropneumatic system operating on the straight air principle but with associated automatic brake pipe, vent valve and application valve to provide for automatic braking on occasion.

In the drawings:

Figure 1 is a vertical axial section through the engineer's brake valve and measured inshot valve with pipe connections. Release position is shown.

Figure 2:
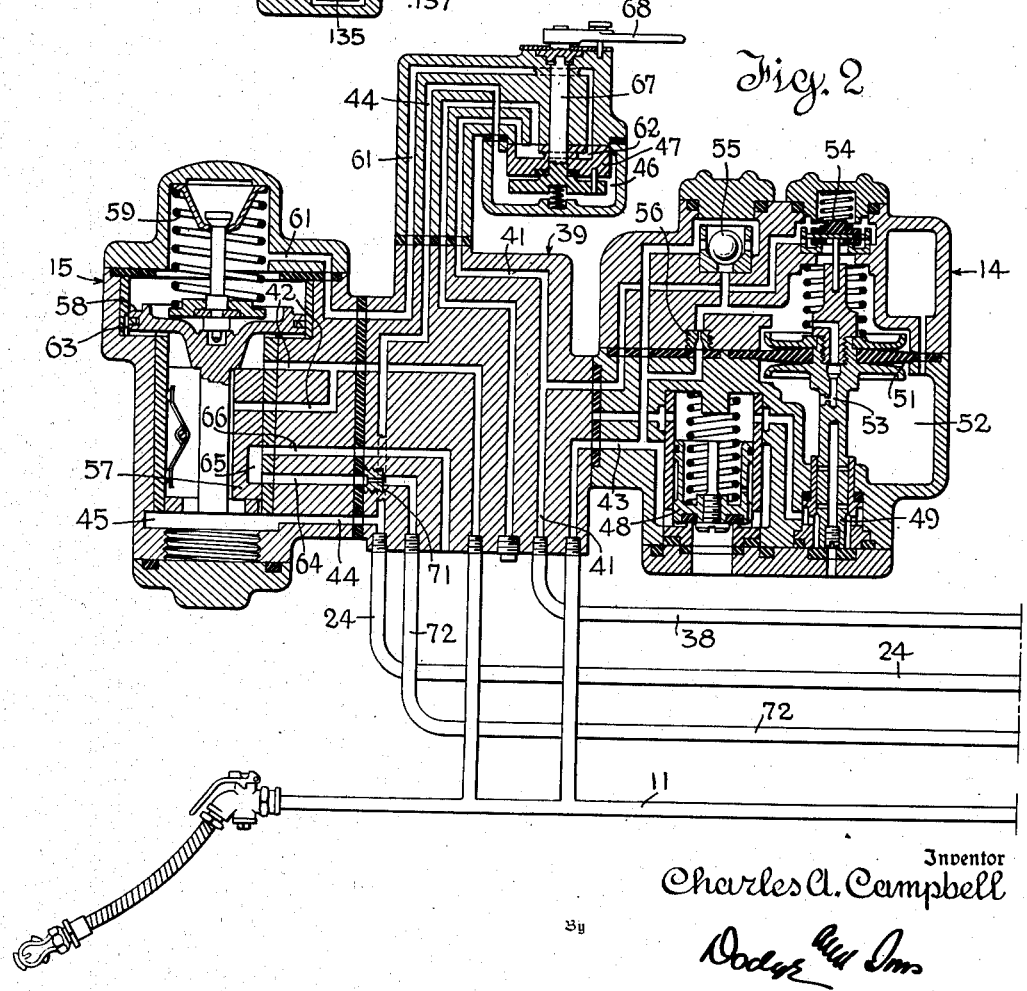
Fig. 2 is a similar view of the application valve, vent valve, reset valve and pipe connections. Normal or running positions are shown.
Figure 3:
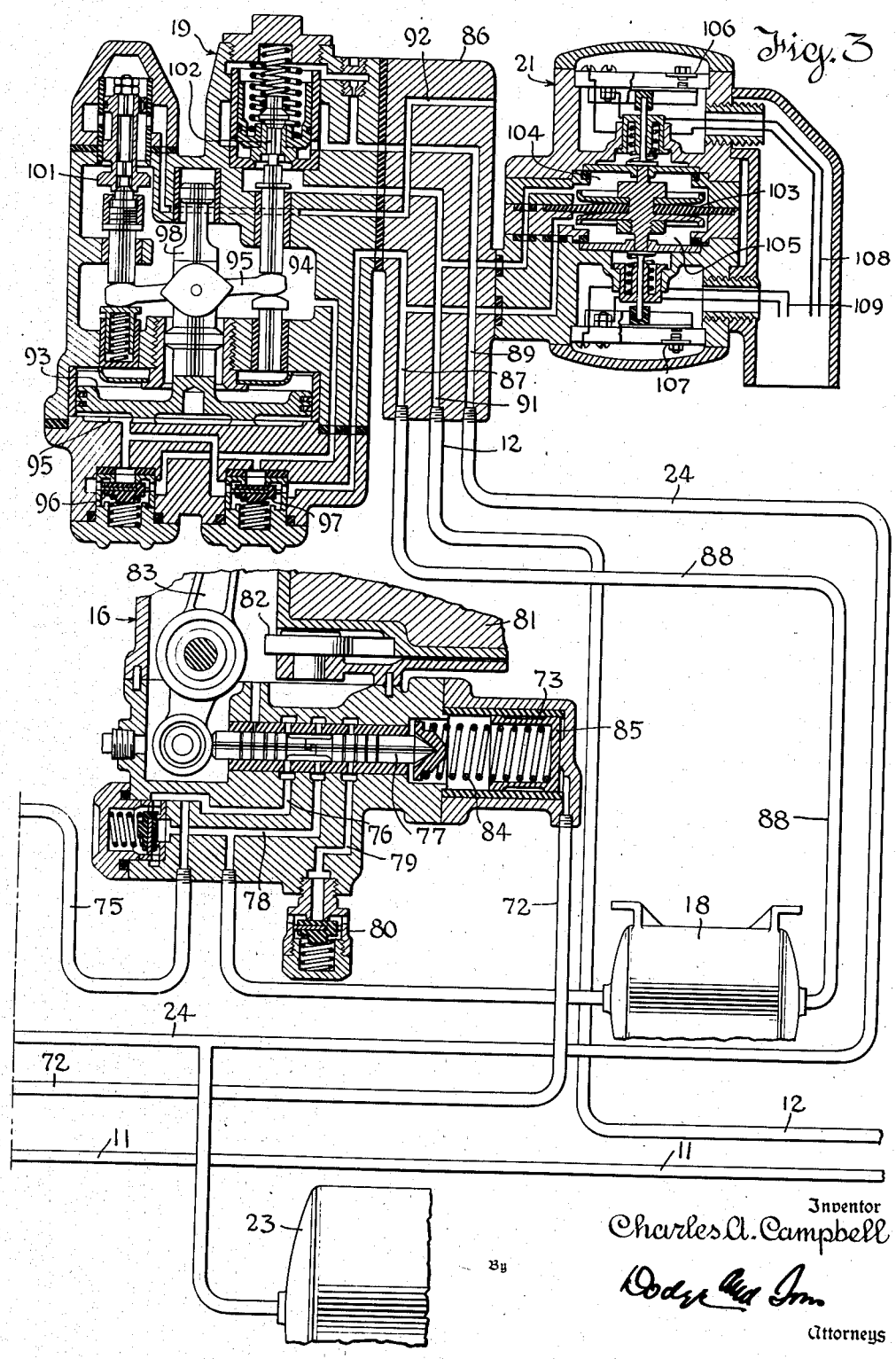
Fig. 3 is a similar view showing the pneumatic relay and the associated electric relay switch in release position and the decelerometer in normal (running) position. Piping and electric connections are indicated.

Note.—Figs. 2, 1 and 3 when assembled in the order stated from left to right form a complete diagrammatic illustration of the head-end or controlling portion of the HSC system with the present invention incorporated.

Figs. 4, 5, 6, 7 are fragmentary views showing the rotary valve of the engineer's brake valve (Fig. 1) in the following functional positions, respectively: lap, slow service, fast service, and (automatic) emergency.

Figure 8:
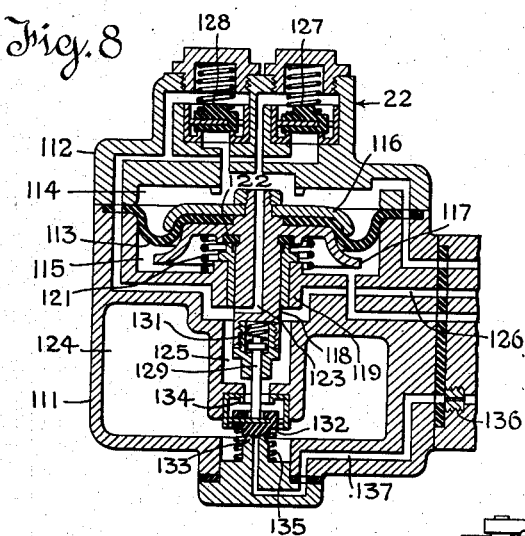

Fig. 8 shows the measured inshot valve of Fig. 1 in the position which it assumes when the rotary valve is initially placed in slow service position (Fig. 5) and in which position it remains until the engineer's brake valve is returned to release position (Fig. 1).

Figure 9:
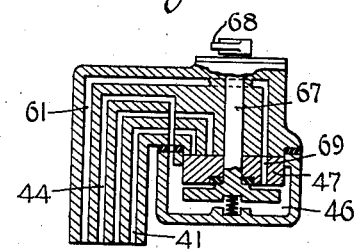

Fig. 9 shows the reset valve of Fig. 2 set to release the brakes and cause recharge of the automatic brake pipe after an automatic emergency application.

In the various figures the porting is diagrammatic to the extent that all ports are shown on the plane of section to permit flows to be traced. More compact arrangements are used commercially but involve merely conventional relocation of ports and passages.

In a system of the type shown in the above drawings, there are two pipes which run throughout the length of the train, namely, the brake pipe or supervisory line 11 which may control the brakes on the automatic principle, and a control pipe 12 which controls the brakes on the straight air principle. That is to say, the brake pipe 11 is normally charged and applies the brakes upon the reduction of pressure in the pipe; the control pipe 12 is normally vented and applies the brakes in proportion to pressures developed in the control pipe by operation of the engineer's brake valve, or by operation of the application valve.

The control valve mechanism on the cars is not illustrated in the drawings. It may assume various forms, but the so-called D-22 control valve, standard in the industry, may be used. This comprises a triple valve and a change-over device such as either the triple valve or the control pipe may assume control of the local relay. The relay valve normally responds to pressure in the control pipe 12, and the triple valve responds only to pressure in the brake pipe 11. When the triple valve responds to reduction of pressure in the brake pipe, it assumes control of the relay, but not to the exclusion of the control pipe which may resume control if an effective braking pressure is developed in the control pipe 12. These features are known in the art and are not a part of the present invention, but are mentioned here for a clear understanding.

The elements illustrated in the drawings of the present application are carried on the leading or propelling unit. It should be understood that this unit also carries control valves connected with the control pipe and brake pipe for regulating the application of brakes on the propelling units. These valves are not illustrated in the drawings.

The engineer controls the train through an engineer's brake valve generally indicated by the numeral 13, Fig. 1, which has five functional positions: a combined release and running position, shown in Fig. 1, in which the control pipe is vented to atmosphere, as will later be explained; a lap position (Fig. 4) in which all ports are blanked; a slow service position (Fig. 5) in which air from the main reservoir is supplied at a restricted rate to the control chamber, as will hereinafter be described; a fast service position (Fig. 6) which is functionally similar to slow service except that air is supplied to the control chamber at a rapid rate; and an emergency position (Fig. 7), which in the example illustrated is initially of the automatic type.

In emergency operation the brake pipe is vented through the response of an automatic vent valve indicated as a whole by the numeral 14 (Fig. 2), which will also respond to reduction of brake pipe pressure produced by operation of conductors' valves, etc. At such times, charging flow to the brake pipe is interrupted by an application valve generally indicated by the numeral 15, also shown in Fig. 2, the application valve then serving to supply main reservoir air to a straight air emergency pipe connected with the control chamber and also to the loading cylinder of the decelerometer indicated generally by the numeral 16 (Fig. 3). The effect of this is to develop a brake applying pressure in the control chamber at a rather rapid rate and to set the decelerometer to regulate the brakes in such a way as to produce the higher of two deceleration rates, the lower of which is effective both in slow service and in fast service manipulation. Thus when the application valve 15 and the vent valve 14 start a strictly automatic emergency application through the automatic side of the system (pipe 11) they also initiate a straight air application by developing pressure in the control chamber. This second or straight air function will take control at the control valves, unless defeated by a ruptured control pipe or other defect, and will be modulated by the decelerometer.

The engineer's brake valve 13 and the application valve 15 are related to the decelerometer 16 through a double throw check valve 17 so that if either functions to deliver braking pressure it will be connected with the control chamber. The air so supplied by either passes under control of the decelerometer 16 to the control chamber 18. The pressure developed in this control chamber is subject to a modulating control (reduction) by the decelerometer 16, to release the application as the coefficient of brake shoe friction increases, so that uniform deceleration will be had.

Pressure in the control chamber 18 controls the pressure in the control pipe 12 through a relay mechanism made up of two units, a pneumatic relay 19 and an electric relay switch 21 which last operates magnet valves throughout the train to admit and exhaust air to and from the control pipe 12.

Upon the development of braking pressure in the control chamber 18, the pneumatic relay indicated as a whole by the numeral 19, moves to a lap position and there stalls if the electric relay switch is effective, as it should be, to develop braking pressure in the control line 12. If the electric relay switch indicated as a whole by the numeral 21, or the devices controlled thereby, should fail to function, then the pneumatic relay 19 will move further to an active position and supply main reservoir air to the control line 12.

The above general description identifies the main control components of the system as heretofore used. To this has been added a measured inshot valve, generally indicated by the numeral 22 (Fig. 1). This valve is closely associated with the engineer's brake valve 13 and is interposed in the path of flow from the engineer's brake valve to the control chamber 18. Its function is to accumulate under running conditions a definite volume of air under supply pressure and upon the initiation of a service application, whether slow or fast, to deliver this charge of air rapidly to the control chamber 18. The measured volume of air stored by the inshot valve 22 is so chosen, with reference to the volume of the control chamber 18, that control chamber pressure will immediately rise to a value which will bring the brakes to the point of application without, however, developing a substantial braking pressure.

The inshot valve 22 is so arranged that it does not interfere with, but in fact actually accelerates the fast service application, and it is further so contrived that it cannot reset until the brakes are substantially released.

The main reservoir is indicated at 23 and the main reservoir pipe at 24. This pipe has a number of branches leading to the application valve, the engineer's brake valve and the master relays, as clearly shown in the drawings.

Referring first to Fig. 1 and Figs. 4 to 7, inclusive, the structure of the engineer's brake valve will be described.

The main reservoir connection to the engineer's brake valve leads to the rotary valve chamber 25 which is formed in the pipe bracket member 26 of the engineer's brake valve 13. The rotary valve 27 is manipulated by means of stem 28 and handle 29 in the usual manner. The seat for the rotary valve has three ports: an emergency port 31, by means of which the vent valve 14 and the application valve 15 are controlled; a control chamber port 32, which is the connection to the control chamber 18, such connection leading through various pieces of apparatus hereinafter described; and an exhaust port 33 which leads directly to atmosphere.

In release and running position, shown in Fig. 1, the cavity 34 in the rotary valve connects the control chamber port 32 with the exhaust port 33. The emergency port 31 is blanked.

In lap position, Fig. 4, all ports are blanked by the rotary valve.

In slow service position, Fig. 5, the ports 31 and 33 are blanked and a restricted port 35 through the rotary valve supplies main reservoir air from the rotary valve chamber to the control chamber port 32.

In fast service position, Fig. 6, a larger through port 36 performs the same function of admitting main reservoir air to the control chamber port 32, but being much larger, admits it at a rapid rate.

In the emergency position, Fig. 7, the control chamber port 32 is blanked and the emergency port 31 is connected with the atmospheric exhaust port 33 by means of the port 37 formed in the rotary valve.

Referring now to Fig. 2, the application and vent valves, which conform in all essential particulars with the structure described and claimed in my allowed application, Serial No. 39,871, filed September 9, 1935, will be described. The emergency port 31 of the engineer's brake valve is connected by way of pipe 38 to a port 41 in the pipe bracket 39. This pipe bracket sustains the application valve and the vent valve and to this all pipe connections are made. The brake pipe 11 is connected to this pipe bracket and communicates with twin ports 42 in the slide valve seat of the application valve 15, and also with the passage 43 of the vent valve 14. The main reservoir pipe 24 is connected to the bracket 39 and communicates with a port 44 which leads to the slide valve chamber 45 of the application valve and also to chamber 46 of the reset valve. In this chamber, the rotary reset valve 47 is mounted. Its porting will be described later.

Reverting now to the vent valve shown at the right of Fig. 2, the main vent valve is a spring loaded cup valve 48 which when relieved of pneumatic loading on its rear face, will open in response to brake pipe pressure and vent the brake pipe directly to atmosphere. This operation is ordinarily produced by the opening of a pilot valve 49 which serves to vent the space to the rear of the cup valve directly to atmosphere.

The pilot valve 49 is also spring seated and is opened by the diaphragm 51 when brake pipe pressure which is communicated through brake pipe port 43 or pressure in the emergency port 41 is sharply reduced. At such time, the pressure in the quick action chamber 52 predominates and forces the diaphragm upward to open the pilot valve. The chamber 52 is charged from the brake pipe through the charging port 53. A check valve 54 which is spring loaded in its closing direction and which is forced open when the pilot valve 49 opens, is provided to prevent flow under normal conditions from the port 41 to the space above the diaphragm 51. It opens to permit flow in the reverse direction so that the emergency port 31, 41 may control the vent valve directly.

The check valve 55 and the choke 56 control connection from the brake pipe port 43 to the space above the diaphragm 51. They permit rapid flow to the brake pipe from this space so that the diaphragm will respond to a sudden reduction of brake pipe pressure, but they control the build up of pressure in the space above the diaphragm 51 in relation to the charging port 53.

This vent valve as above very generally described, is typical of any device which in response to a sudden reduction of brake pipe pressure or to a sudden reduction of pressure in emergency port 31, 41, will vent the brake pipe freely and rapidly to atmosphere.

The application valve 15, which is shown to the left in Fig. 2, comprises a slide valve 57 actuated by a piston 58 and biased by spring 59 to its lowermost position, shown in Fig. 2. The space above the piston 58 is connected by a passage 61 and cavity 62 in the reset valve 47 with the passage 41 and, consequently, with the emergency port 31 of the engineer's brake valve.

A charging groove 63 which leads around the edge of piston 58 when the latter is in its normal lower position, keeps the ports 61, 41, 31 charged under normal conditions. This charging groove is overtraveled and closed if the piston 58 moves upward.

Under running conditions, the application valve feeds main reservoir air from the slide valve chamber 45 to the ports 42 and hence to the brake pipe, and at the same time the straight air emergency port 64 formed in the seat of the slide valve is vented to atmosphere by cavity 65 in the slide valve and exhaust port 66 in its seat. If the piston 58 moves upward in response to an emergency actuation of the engineer's brake valve 13, or in response to an emergency venting operation of the vent valve 14, the slide valve blanks the ports 42, terminating the feed to the brake pipe and at the same time, exposes emergency straight air port 64 so that main reservoir air is admitted to the port 64 which, as hereafter explained, initiates an emergency application on the straight air side of the system.

In order to reset the piston 58 after an automatic emergency, whether caused by manipulation of the engineer's brake valve or by sudden reduction of brake pipe pressure produced by rupture of the brake pipe 11 or the operation of a conductor's valve, some means must be provided to reestablish the pressure above the piston 58. The rotary valve 47 which may be turned through the stem 67 and handle 68, has a reset position shown in Fig. 9 in which a through port 69 admits main reservoir air from the valve chamber 46 to the port 61. This, as explained, leads to the space above the piston 58. The valve 47 is not left in reset position but is restored to the running position of Fig. 2 as soon as the application valve has reset and has reestablished the charging connection through ports 42 to the brake pipe.

This arrangement is considered better than providing a reset port in the engineer's brake valve. The latter arrangement, however, is a known alternative in systems of this general class.

The straight air emergency port 64, previously mentioned, leads through a choke 71 and pipe 72 to the lower of the two end connections of the check valve 17 and leads also to the end of the loading cylinder 73 of the decelerometer 16. The pipe 74 leads from the pipe bracket 25 of the engineer's brake valve 13 to the upper end connection of the double check valve 17. Thus, the check valve connects whichever of the pipes 72 and 74 is under pressure to a pipe 75 connected to the side of the double check valve and leading to the inlet port 76 of the decelerometer valve (see Fig. 3).

The decelerometer 16 is shown only in fragmentary form but the essential components are illustrated. Its controlling element is a balanced piston valve 77 which connects the control chamber port 78 selectively with the inlet port 76 and the exhaust port 79. The exhaust port 79 leads to atmosphere through the usual retaining check valve 80.

The valve 77 is actuated by an inertia mass 81 which is guided on rollers, some of which appear at 82, to move in a path parallel with the direction of travel of the train. When the mass moves forward relatively to the train as the result of brake application, it reacts through lever 83 upon the forward end of the valve 77, forcing the valve rearwardly against the resistance of the spring 84. This spring is seated under initial stress against a loading piston 85 which works in the cylinder 73, already mentioned. When pressure is admitted to the cylinder 73 through the straight air emergency pipe 72, the piston is forced to the left, stressing the spring 84 more heavily and thus loading the decelerometer to maintain a somewhat higher deceleration rate than that maintained in service applications.

The structure of the decelerometer is not claimed herein but forms the subject matter of other applications, notably Serial No. 724,990, filed May 10, 1934.

When pressure fluid is admitted to the pipe 75 from either the pipe 74 (service application) or the pipe 72 (emergency application), it flows by way of ports 76 and 78 to the control chamber 18. The pressure so developed in the chamber 18 causes the application of the brakes. The function of the decelerometer is to terminate the build up of control chamber pressure when the desired deceleration rate is reached and thereafter to reduce control chamber pressure at such a rate as to maintain the deceleration rate constant despite the rising coefficient of brake shoe friction, which is characteristic of falling train speed.

The pressure in the control chamber 18 operates through a master relay mechanism comprising a pneumatic relay 19 and an electric relay switch 21. These involve patentable features which are described and claimed in my application, Serial No. 724,989, filed May 10, 1934.

The pipe bracket 86 on which the relay mechanism is supported has a port 87 connected by pipe 88 with the control chamber 18. It also includes a main reservoir port 89 to which the main reservoir pipe 24 is connected and a control pipe port 91 to which the control pipe 12 is connected. The bracket also includes an exhaust port 92. The pneumatic relay is of a type standard in the art and hence requires only a brief description. It includes a relay piston 93 which is subject on its upper face to control pipe pressure acting in the chamber 94, and on its lower face to control chamber pressure acting in the chamber 95. The check valves shown at 96 and 97 are loaded bypass check valves serving to connect the control chamber and the control pipe directly for either direction of flow if an abnormally large pressure differential is built up between them.

Connected to piston 93 is a stem 98 which carries pivoted to it a rocker arm 99. This rocker arm functions to permit the exhaust valve 101 leading from chamber 94 to atmosphere via port 92, to open when the piston is in its lowermost position. At this time the inlet valve 102 is closed. As the piston moves upward its first effect is to close the exhaust valve 101 and then force open the inlet valve 102, admitting main reservoir air from port 89 to the chamber 94. However, the inlet valve offers considerable resistance to opening, so that when the piston moves up and closes the exhaust valve, it normally stalls in what may be described as a lap position.

Reliance is placed on the relay switch to develop the desired pressure in the control valve. This switch comprises a diaphragm 103 which responds to the differential between control pipe pressure acting in chamber 104 and control chamber pressure acting in the chamber 105. The application switch 106 and the release switch 107 are both normally open. If control chamber pressure predominates, the diaphragm moves upward and closes the application switch; if control pipe pressure predominates, the diaphragm moves downward and closes the release switch. These switches control application and release circuits partially indicated in the drawings at 108 and 109, which include magnet valves on the various cars (not shown).

The application circuit magnet valves function when energized to admit air under pressure to the control pipe, and the release magnet valves function when energized to vent pressure from the control pipe. It will be observed, therefore, that when pressure is established in the control chamber 18, the electropneumatic side of the system operates to develop a corresponding control pipe pressure throughout the length of the train. Similarly, when control chamber pressure is lowered the control pipe pressure is correspondingly lowered. During these operations, the master pneumatic relay 19 remains in lap position, but it will move to application position and assume control if the electric circuits fail to function. Should the pneumatic relay also fail to function, the bypass checks 96 and 97 will permit direct control of the control pipe pressure with a moderate differential.

The system above described embodies the general principles of my application, Serial No. 27,758, filed June 21, 1935, and, consequently, no novelty is here claimed either for the system or for those components of the system which have already been described as covered by prior applications. The description of the system aspects is given to afford a proper background for the disclosure of the measured inshot valve which is of general utility but which develops peculiar value and functions in conjunction with a system of this general type.

The inshot valve, which is indicated generally at 22, is mounted at the side of the engineer's brake valve 13 and its body is made up of two parts, a main housing 111 and a cap 112. Between the members 111 and 112 is clamped a combined gasket and diaphragm 113. The chamber 114 above the diaphragm is in free communication with the control chamber port 32 of the engineer's brake valve. The chamber 115 below the diaphragm is vented to atmosphere in any suitable way, a convenient means being the exhaust port 33 from the engineer's brake valve.

Clamped to the center of the diaphragm 113 are the plates 116 and 117 which stiffen the center of the diaphragm and control its flexure. One of these plates is formed integrally with a stem 118 which is directed in its longitudinal movements by a guide 119. The spring 121 urges the diaphragm upward with a force which will approximately balance a pressure of 3 lbs. per square inch acting on the diaphragm. When the diaphragm is forced downward against the resistance of the spring 121, a gasket 122 produces a seal around the stem 118, preventing leakage. Formed in the stem 118 is a through port 123 having a lateral extension in the lower end so located that when the diaphragm is in its upper position, Fig. 1, the port is blanked because within the guideway. For lack of a better term, the valve thus provided will be called an intercepting valve.

When the diaphragm is forced to its lowermost position, Fig. 8, the port 123 communicates with the chamber 125 which is connected by a passage 126 with the pipe 74. This pipe, as already described, leads by way of the double check valve 17 and the decelerometer 16 to the control chamber 18.

Below and partly surrounding the chamber 125 is a closed measuring chamber 124 which is alternately and selectively connected with the main reservoir to accumulate a charge and with the chamber 125 to deliver that charge to the control chamber 18.

The chamber 114 above the diaphragm 113 and the chamber 125 which is connected with the control chamber 18 are separated by reversely seated check valves 127 and 128. Check valve 127 is lightly loaded and is provided to permit back flow during release. Check valve 128 is loaded to resist a pressure higher than that to which the diaphragm 113 responds. Thus, if the diaphragm 113 starts to move downward under pressure of 3 lbs. per square inch, a satisfactory loading for the valve 128 is that which will cause the valve to open under a differential of about 5 lbs. per square inch. Thus, the valve 128 will not open until diaphragm 113 has moved downward.

The lower end of the stem 118 carries a thrust pin 129 which is guided to slide longitudinally in stem 118 and which is urged outward by a spring 131 of sufficient strength to shift the double acting check valve 132 against the urge of its seating spring. The valve 132 is of the rubber-faced metal cored variety and seats against two opposed seats; seat 133, to which main reservoir air is supplied by passage 137 from the chamber 25, and a control chamber seat 134, which controls communication to the chamber 125.

A spring 135 urges the valve 132 toward the seat 134, while the thrust pin 129 will, upon descent of the diaphragm 113, shift the valve to the other seat and hold it there with sealing force. The rate of supply of air through the port 137 is controlled by a choke 136.

*Operation*

The operation of the system as a whole has already been described and is known in the art. The operation of the measured inshot valve requires description in connection with slow service and fast service functions.

*Slow service.*—The rotary valve is put in the position of Fig. 5 so that main reservoir air is fed slowly to the port 32. As soon as the pressure in the chamber 114 reaches 3 lbs. gage, as it will quite promptly, the diaphragm moves down and shifts valve 132 from its upper to its lower seat. During running conditions, the chamber 124 was charged to main reservoir pressure. The shifting of the valve isolates the chamber from the main reservoir and connects it to the chamber 125 and, consequently, through port 126, pipe 74, double check valve 17, pipe 75 and the decelerometer 16 with the control chamber 18.

The volume of the chamber 124 is so chosen that the admission of this volume of air at main reservoir pressure will establish in the control chamber 18 a pressure sufficient to initiate a brake application. Ordinarily, this desired pressure is of the order of fifteen to twenty lbs. The pressure to be established is dependent upon the characteristics of the brake rigging and it requires only the choice of a proper volume for chamber 124.

*Fast service.*—The operation in fast service is exactly the same so far as the measured inshot valve is concerned, but the pressure in the chamber 114 will rise so rapidly that the 5 lb. loading of the check valve 128 will quickly be exceeded so that the valve 128 will open, permitting main reservoir air to flow by way of the engineer's brake valve and chamber 125 directly to the control chamber.

The diaphragm 113 remains in its lowermost position until control chamber pressure has dropped below 3 lbs. At that time, the brakes will have been released. Consequently, a service graduation by manipulation of the handle 29 between lap, release and slow service positions can be carried out so long as the braking intensity does not cause the decelerometer 16 to take control. Releasing flow to the engineer's brake valve takes place partly through the port 123 but also through the lightly loaded check valve 127.

*Emergency.*—If the engineer's brake valve 13 is moved to emergency position, the measured inshot valve does not take part in the application. The first effect is venting of the brake pipe and emergency response of the application valve to terminate feed to the brake pipe. This will produce an emergency application through emergency response of the triple valves throughout the train. However, the response of the application valve starts a straight air application through the pipe 72, double check valve 17, pipe 75 and decelerometer 16 to the control chamber 18, which then functions through the master relays. As stated, the straight air or control pipe 12 will assume control of the local relays if an effective pressure is developed in it, irrespective of the response of the triple valve. Thus, an emergency application occasioned in any way will be decelerometer controlled if the straight air side of the system functions.

While a particular embodiment of this invention and its use with a particular system have been described in detail, this is intended to be illustrative and not limiting.

What is claimed is:

1. In a train brake system, the combination of a brake controlling relay mechanism including a control chamber, so arranged that pressures established therein operate the relay to effect a related control of braking; a source of pressure fluid; an engineer's brake valve having a release position in which it serves to vent said control chamber, and a slow application position in which it supplies pressure fluid from said source to said chamber at a restricted rate; and means rendered effective by motion of the engineer's brake valve from release to slow application position to raise control chamber pressure rapidly through a limited range.

2. In a train brake system, the combination of a brake controlling relay mechanism including a control chamber, so arranged that pressures established therein operate the relay to effect a related control of braking; a source of pressure fluid; an engineer's brake valve having a release position in which it serves to vent said control chamber, and a slow application position in which it supplies pressure fluid from said source to said chamber at a restricted rate; and means rendered effective by motion of the engineer's brake valve from release to slow application position to admit to the control chamber a definite volume of pressure fluid at supply pressure.

3. The combination of a brake controlling relay valve mechanism having a control chamber; a source of pressure fluid; an engineer's brake valve for admitting pressure fluid from said source to said control chamber and for exhausting pressure fluid from said control chamber; a measuring chamber normally connected with said source to be charged therefrom; and means responsive to the initial flow of pressure fluid from the engineer's brake valve toward the control chamber to disconnect said measuring chamber from said source and connect it with said control chamber, and thereafter responsive to control chamber pressure to maintain such connection until control chamber pressure has been substantially released, and then disconnect the measuring chamber from the control chamber and reconnect it with said source.

4. The combination of a brake controlling relay valve mechanism having a control chamber; a source of pressure fluid; an engineer's brake valve for admitting pressure fluid from said source to said control chamber and for exhausting pressure fluid from said control chamber; a measuring chamber normally connected with said source to be charged therefrom; an intercepting valve interposed in a passage between the engineer's brake valve and the control chamber to control flow therebetween; means biasing said valve in a closing direction; an abutment connected with said valve subject to pressure flowing from said engineer's brake valve toward said intercepting valve and serving under the urge of such pressure to open said intercepting valve; and a valve mechanism for selectively connecting said measuring chamber with said source and with said control chamber and arranged to be actuated by said abutment, the parts being so arranged that when the intercepting valve is open, the measuring chamber is connected with the control chamber, and when the intercepting valve is closed the measuring chamber is connected with the source of pressure fluid.

5. The combination of a brake controlling relay valve mechanism having a control chamber; a source of pressure fluid; an engineer's brake valve for admitting pressure fluid from said source to said control chamber and for exhausting pressure fluid from said control chamber; a measuring chamber normally connected with said source to be charged therefrom; an intercepting valve interposed in a passage between the engineer's brake valve and the control chamber to control flow therebetween; means biasing said valve in a closing direction; an abutment connected with said valve subject to pressure flowing from said engineer's brake valve toward said intercepting valve and serving under the urge of such pressure to open said intercepting valve; a valve mechanism for selectively connecting said measuring chamber with said source and with said control chamber and arranged to be actuated by said abutment, the parts being so arranged that when the intercepting valve is open, the measuring chamber is connected with the control chamber, and when the intercepting valve is closed the measuring chamber is connected with the source of pressure fluid; a pair of reversely seated check valves controlling a bypass around said intercepting valve; and means for loading said bypass valves in closing directions, the loading for that bypass valve which opens to permit flow toward the engineer's brake valve being light, and the loading of the bypass check valve which permits flow in the reverse direction being heavier and sufficient to hold the check valve closed against a pressure sufficient to displace said abutment.

6. The combination with the structure defined in claim 3, of a modulating valve responsive to deceleration produced by a brake application and serving to control the deceleration rate by closing communication between the engineer's brake valve and the control chamber and modulating control chamber pressure, the volume of the measuring chamber being so related to the volume of the control chamber that the brake applying tendency initiated by connection of the measuring chamber with the control chamber is insufficient to produce a retardation to which said deceleration controller will respond.

7. The combination with the structure defined in claim 4, of a modulating valve responsive to deceleration produced by a brake application and serving to control the deceleration rate by closing communication between the engineer's brake valve and the control chamber and modulating control chamber pressure, the volume of the measuring chamber being so related to the volume of the control chamber that the brake applying tendency initiated by connection of the measuring chamber with the control chamber is insufficient to produce a retardation to which said deceleration controller will respond.

8. The combination with the structure defined in claim 3, of a normally charged brake pipe; and an application valve responsive to the depletion of pressure in said brake pipe to admit air from said source directly to said control chamber, whereby the brake applying function of the application valve is unaffected by said means responsive to initial flow.

9. The combination with the structure defined in claim 3, of a normally charged brake pipe; and an application and vent valve mechanism responsive to depletion of brake pipe pressure to vent the brake pipe, suspend charging of the brake pipe, and admit pressure fluid from said source to said control chamber directly, said engineer's brake valve having an emergency position in which it causes operation of said application and vent valve.

10. The combination of a relay mechanism for controlling air brakes and having a control chamber; a source of pressure fluid; an engineer's brake valve having a slow service position in which it supplies pressure fluid at a restricted rate to said control chamber, a fast service position in which it admits pressure fluid at a rapid rate from said source to said control chamber, and a release position in which it vents fluid from said control chamber; a measuring chamber normally connected with said source; an intercepting valve interposed in the communication between the engineer's brake valve and said control chamber; means biasing said valve in a closing direction; a movable abutment subject to pressure fluid flowing from the engineer's brake valve toward the control chamber and serving in response to such pressure to open said intercepting valve; valve means operable by said abutment and serving when said intercepting valve is closed to connect said measuring reservoir with said source of fluid pressure and disconnect it from said control chamber, and serving when said intercepting valve is open to isolate said measuring chamber from said source and connect the measuring chamber with the control chamber; and a pair of reversely seated bypass check valves controlling a bypass around said intercepting valve, the bypass check valve which permits the releasing flow toward the engineer's brake valve being lightly loaded, and the bypass check which permits flow toward the control chamber being loaded sufficiently to insure response of said abutment to pressure fluid flowing toward the control chamber, whereby the intercepting valve controls flow in slow service position, and the bypass check valve opens to permit rapid flow in fast service position.

11. In a braking system, the combination of a relay mechanism having a control chamber and arranged to control application and release of the brakes throughout a train in accordance with pressures in said chamber; a source of pressure fluid; an engineer's brake valve operable to supply pressure fluid from said source to said control chamber and to exhaust pressure fluid from said control chamber; a measuring chamber; an inshot valve mechanism having two functional positions in one of which it charges said measuring chamber from said source, and in the other of which it disconnects said measuring chamber from said source and connects it directly with said control chamber; means biasing said inshot valve to the first named position; motor means adapted to be operated by pressure fluid supplied by said engineer's brake valve and flowing toward said control chamber to shift said inshot valve mechanism to the second named position; and a valve associated with said motor and arranged to resist flow from said engineer's brake valve to said control chamber until said motor has shifted said inshot valve mechanism to the second named position.

12. In a braking system, the combination of a relay mechanism having a control chamber and arranged to control application and release of the brakes throughout a train in accordance with pressures in said chamber; a source of pressure fluid; an engineer's brake valve adapted to supply pressure fluid at at least two different rates one slow and another rapid from said source to said control chamber and to exhaust pressure fluid from said control chamber; a measuring chamber; an inshot valve mechanism having two functional positions in one of which it charges said measuring chamber from said source, and in the other of which it disconnects said measuring chamber from said source and connects it directly with said control chamber; means biasing said inshot valve to the first named position; motor means adapted to be operated by pressure fluid supplied by said engineer's brake valve and flowing toward said control chamber to shift said inshot valve mechanism to the second named position; a valve associated with said motor and arranged to resist flow from said engineer's brake valve to said control chamber until said motor has shifted said inshot valve mechanism to the second named position; and a loaded check valve mechanism controlling a one-way bypass from the engineer's brake valve directly to the control chamber, the loading of said valve being such as to hold the bypass valve closed when the engineer's brake valve feeds air at a restricted rate and to open and permit rapid flow when the engineer's brake valve supplies air at a rapid rate.

13. In a braking system, the combination of a relay mechanism having a control chamber and arranged to control application and release of the brakes throughout a train in accordance with pressures in said chamber; a source of pressure fluid; an engineer's brake valve adapted to supply pressure fluid at two different rates, one slow and the other rapid, from said source to said control chamber and to exhuast pressure fluid from said control chamber; a measuring chamber; an inshot valve mechanism having two functional positions in one of which it charges said measuring chamber from said source, and in the other of which it disconnects said measuring chamber from said source and connects it directly with said control chamber; means biasing said inshot valve to the first named position; motor means adapted to be operated by pressure fluid supplied by said engineer's brake valve and flowing toward said control chamber to shift said inshot valve mechanism to the second named position; a valve associated with said motor and arranged to resist flow from said engineer's brake valve to said control chamber until said motor has shifted said inshot valve mechanism to the second named position; a loaded check valve controlling a one-way by-pass from the engineer's brake valve directly to the control chamber, the loading of said valve being such as to hold the by-pass valve closed when the engineer's brake valve feeds air at a restricted rate and to open and permit rapid flow when the engineer's brake valve supplies air at a rapid rate; and a second and relatively reversely seated check valve controlling a direct communication from the control chamber to the engineer's brake valve and adapted to open and permit substantially free exhaust of said control chamber in the releasing position of said engineer's brake valve.

CHARLES A. CAMPBELL.